US012754717B2

(12) United States Patent
Levitt et al.

(10) Patent No.: US 12,754,717 B2
(45) Date of Patent: Oct. 6, 2026

(54) DECENTRALIZED SOFTWARE DEVELOPMENT ENVIRONMENT FOR FUNCTION-BASED EXECUTABLE APPLICATIONS

(71) Applicant: Trixta, Inc., Phoenix, AZ (US)

(72) Inventors: Mark Levitt, Phoenix, AZ (US); Barry Worthington Hill, Phoenix, AZ (US); Kevin Grant Fourie, Phoenix, AZ (US)

(73) Assignee: Trixta, Inc., Phoenix, AZ (US)

( * ) Notice: Subject to any disclaimer, the term of this patent is extended or adjusted under 35 U.S.C. 154(b) by 266 days.

(21) Appl. No.: 18/350,247

(22) Filed: Jul. 11, 2023

(65) Prior Publication Data

US 2024/0020100 A1 Jan. 18, 2024

Related U.S. Application Data

(60) Provisional application No. 63/388,526, filed on Jul. 12, 2022.

(51) Int. Cl.
*G06F 8/35* (2018.01)
*G06F 8/34* (2018.01)

(52) U.S. Cl.
CPC . *G06F 8/35* (2013.01); *G06F 8/34* (2013.01)

(58) Field of Classification Search
CPC ................. G06F 8/34; G06F 8/35; G06F 8/36
See application file for complete search history.

(56) References Cited

U.S. PATENT DOCUMENTS 10,048,961 B2 * 8/2018 Gu ............................ G06F 8/71
10,705,835 B2 * 7/2020 Banerjee ................... G06F 8/60
2003/0120711 A1 * 6/2003 Katz ..................... H04L 69/329 718/106
2008/0092131 A1 * 4/2008 McIntyre .................. G06F 8/71 717/172
2010/0064284 A1 * 3/2010 Winter ....................... G06F 8/70 717/169
2013/0212554 A1 * 8/2013 Maeda ...................... G06F 8/41 717/105
2014/0108503 A1 * 4/2014 Haykal ................... G06F 9/451 709/203
2015/0169295 A1 * 6/2015 Kyoso ................. G06F 11/3604 717/109
2023/0185543 A1 * 6/2023 Sumin ..................... G06F 9/451 717/107

FOREIGN PATENT DOCUMENTS

EP 4089526 A1 * 11/2022 ............... G06F 8/36
WO WO-2007136684 A2 * 11/2007 .......... G06F 11/3604

* cited by examiner

*Primary Examiner* — Ziaul A Chowdhury
(74) *Attorney, Agent, or Firm* — Andrus Intellectual Property Law, LLP

(57) ABSTRACT

A system and method for providing a decentralized software development environment for function-based executable applications are described. The system includes a serverless environment core including a user interface providing a plurality of representations of building-block functions configured to be linked as dependencies to form a function-based executable application. The building-block functions are provided as remote template files called and instantiated by the environment core as required when the executable application is run and wherein the template files are provided in decentralized storage and the instances run in a distributed system.

16 Claims, 4 Drawing Sheets

DECENTRALIZED SOFTWARE DEVELOPMENT ENVIRONMENT FOR FUNCTION-BASED EXECUTABLE APPLICATIONS

CROSS-REFERENCE TO RELATED APPLICATIONS

This application claims priority from U.S. provisional patent application No. 63/388,526 filed on 12 Jul. 2022, which is incorporated by reference herein.

FIELD OF THE INVENTION

This invention relates to software development environments and, in particular, a decentralized software development environment for function-based applications.

BACKGROUND TO THE INVENTION

An integrated development environment (IDE) is a software application that provides comprehensive facilities to computer programmers for software development. An IDE normally consists of at least a source code editor, build automation tools and a debugger. Typically, such IDEs focus on design and development of a particular kind of application: such as databases, business processes, or user interfaces such as web applications. Most IDEs require users to have formal programming skills.

The traditional approach to software development is to use Object Oriented Programming (OOP). OOPs are the conceptual programming techniques that uses objects as the key. Functional programming is an approach that is starting to become more mainstream. Functional programming is a technique that accentuates the functional factors required for creating and implementing the programs. A software function is based on the mathematical construct of a function where an input is received, a process run, and an output emitted. Functional design considers use cases and scenarios, whereas OOP begins by identifying objects and classes. Most strong developers want to move to so-called functional development because it is believed to be a “better way” to build software; however, it is still somewhat non-conventional and only a small percentage of developers have actually crossed the chasm.

Some known serverless systems use functions. Amazon™ Web Services (AWS™) use a serverless system for providing functions, known as Lambda™. Lambda is an event-driven, serverless computing platform and computing service that runs functional code in response to events and automatically manages the computing resources required by that code.

Microsoft™ Azure™ functions is a cloud service available on-demand that provides all the continually updated infrastructure and resources needed to run applications using functions.

Google’s Cloud Functions™ is a serverless execution environment for building and connecting cloud services. With Cloud Functions simple, single-purpose functions are written that are attached to events emitted from a cloud infrastructure and services. A function is triggered when an event being watched is fired.

Existing IDEs save to centralized systems with control and risks residing in the hands of specific entities. There is also a growing trend where many IDEs are becoming server-based where they are centralized.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a system including a processor and a memory for providing a decentralized software development environment for function-based executable applications comprising: a serverless environment core including a user interface providing a plurality of representations of building-block functions configured to be linked as dependencies to form a function-based executable application; and wherein the building-block functions are provided as remote template files called and instantiated by the environment core as required when the executable application is run and wherein the template files are provided in decentralized storage and the instances run in a distributed system.

The user interface may provide visual building tools configured for user configuration and interconnection via the user interface. The plurality of representations of building-block functions may be configured to be linked as dependencies by the visual building tools. The environment core may include core primitive functions providing the visual building tools which are provided as remote template files called and instantiated by the environment core when required and wherein the template files are provided in decentralized storage. The core primitive functions may include: a container function for creating services, an action and reaction function for pointing to flows, a role function for limiting entities to provide the role, and flow functions. The core primitive functions may be provided in a similar decentralized manner to the building-block functions.

The environment core may include internal functions provided as remote template files called and instantiated by the environment core when required by the environment wherein the template files are provided in decentralized storage and wherein internal processes of the environment core are provided by executable applications generated using the environment.

The building-block functions may be discrete text files with definitions in a data interchange format providing a scaffolding for the functions and supporting internal code in one or more programming languages. The core primitive functions may be discrete text files with definitions in a data interchange format providing a scaffolding for the functions in the data interchange format and supporting internal code in the data interchange format or in other languages.

A function-based executable application generated by the environment may be a decentralized application that uses file-based compiling and linking. A function-based executable application generated by the environment may be defined by addresses of linked instances of customer building-block functions managed by the environment and backed by an in-memory data state machine that stores the states of the functions.

The template files may be configured to be called, compiled, linked, instantiated, and run when required. The template files may be precompiled and therefore may be called, linked, instantiated and run when required.

The building-block functions of a function-based executable application may be called, compiled, instantiated and run, and dependent building-block functions of the building-block functions may be called, compiled, instantiated and run, as needed during runtime.

The environment core may be operated by a virtual machine. Alternatively, the environment cores may be operated without a virtual machine as compiled code directly on a user computing device with the template files provided in decentralized peer-to-peer distributed systems. The user computing device may include a memory for storing computer-readable program code and executable on one or more processors to execute the computer-readable program code.

The environment core may include files stored on a distributed file system node on a user computing device with a local version on the file system, when running executable applications the environment talks through the node on the user computing device. The environment core may pull needed library code of the text files at runtime from a separate library repository, parts of which may be private and public.

The user computing device may be a dedicated computing device providing a base processing unit with multiple lower-processing capacity devices providing distributed compute layers and providing an application to a lower-processing device driven from the base processing unit for remote connection.

The decentralized software development environment may include a token system for rewarding a hosting of compute nodes for the environment, wherein a token marketplace is provided in the environment for exchange for environment services. The hosting of compute nodes may include one or more environment nodes and may offer a machine as a compute layer for other people to operate their environment space requiring a processor system to run the compute and memory allocated to hold the state required for the compute.

The decentralized software development environment may include an environment library of software code components referred to as library components shared by or to projects developed in the environment. The library components may include one or more of: function components written in various computer languages, flow components of processes of a series of functions; and space components as a container component of a domain of work including functions, roles, interactions, flows and/or functions.

The decentralized software development environment may include a security arrangement including a non-fungible token (NFT) model for shared use of software code components of the environment, wherein an NFT provides a license to a right to access and/or use components.

The security arrangement may require a user to own an NFT that provides access to files to be used in an application in order to compile the files. An NFT may represent a right to use a code component. The code component may be a specific component or a group of components. The code components may be stored in the environment library. An NFT may represent a right for an environmental space to compute processing on a node.

An NFT may provide access to one or more of: a source code component; a precompiled or compiled version of a code component; or a version of a code component that is hosted on an anonymous node which interacts and effectively becomes part of the application. An NFT may provide security for one or more of: a user building their own components; delegation of building of core components; and building derivative components.

In accordance with another aspect of the invention there is provided a computer-implemented method of providing a software development environment for function-based executable applications comprising: providing a serverless environment core including a user interface providing a plurality of representations of building-block functions configured to be linked as dependencies to form a function-based executable application; and providing the building-block functions as remote template files called and instantiated by the environment core as required when the executable application is run and wherein the template files are provided in decentralized storage.

The user interface may provide visual building tools configured for user configuration and interconnection via the user interface. The plurality of representations of building-block functions may be configured to be linked as dependencies by the visual building tools. The method may include providing core primitive functions of the environment core providing the visual building tools, with the core primitive functions provided as remote template files called and instantiated by the environment core when the executable application is run and wherein the template files are provided in decentralized storage.

The method may include providing internal functions of the environment core provided as remote template files called and instantiated by the environment core when required by the environment with the template files provided in decentralized storage and wherein internal processes of the environment core are provided by executable applications generated using the environment.

The method may include bootstrapping the environment core when it runs to compile and provide the core processes and dependencies to run the function-based applications required to provide the environment core.

The method may include receiving user manipulation of the visual building tools to link representations of the building-block functions to build a function-based executable application.

The method may include generating a function-based executable application using the environment by linking required template files. The method may include running a function-based executable application using the environment by instantiating the required template files from decentralized storage locations and converting the template files into running parts linked together to form the application.

The method may include calling the building-block functions as remote template files in decentralized storage that are compiled unless they are precompiled, linked, instantiated and run and dependent building-block functions of the building-block functions are called, compiled unless they are precompiled, linked, instantiated and run, as needed during runtime. The remote template files are retrieved from decentralized storage and run in a distributed system with nodes provided on multiple computing devices as described further below.

In accordance with a further aspect of the invention there is provided a computer program product for providing a software development environment for function-based executable applications comprising a computer-readable medium having stored computer-readable program code for performing the steps of: providing a serverless environment core including a user interface providing a plurality of representations of building-block functions configured to be linked as dependencies to form a function-based executable application; and providing the building-block functions as remote template files called and instantiated by the environment core as required when the executable application is run and wherein the template files are provided in decentralized storage.

Further features provide for the computer-readable medium to be a non-transitory computer-readable medium and for the computer-readable program code to be executable by a processing circuit.

In accordance with a further aspect of the invention there is provided a computer-implemented method of providing a function-based executable application, comprising: building a function-based executable application including: accessing a user interface providing visual building tools configured for user configuration and interconnection via the user interface and providing a plurality of representations of building-block functions configured to be linked as dependencies by the visual building tools to form a function-based executable application; and calling the building-block functions as remote template files in decentralized storage that are instantiated by the environment core as required when the function-based executable application is run.

In accordance with a further aspect of the invention there is provided a computer-implemented method of providing a function-based executable application, comprising: running a function-based executable application, including: loading a building-block function file with configurations and links to dependent building-block function files and recursively following the dependencies; starting up processes to support the configurations of the linked functions; and compiling and running the customer building-block functions by retrieving remote template files from decentralized storage that are instantiated by the environment core as required.

Running a function-based executable application may include running an internal process of an application software environment in which the function-based executable applications are built and run.

Embodiments of the invention will now be described, by way of example only, with reference to the accompanying drawings.

DETAILED DESCRIPTION WITH REFERENCE TO THE DRAWINGS

Figure 1:
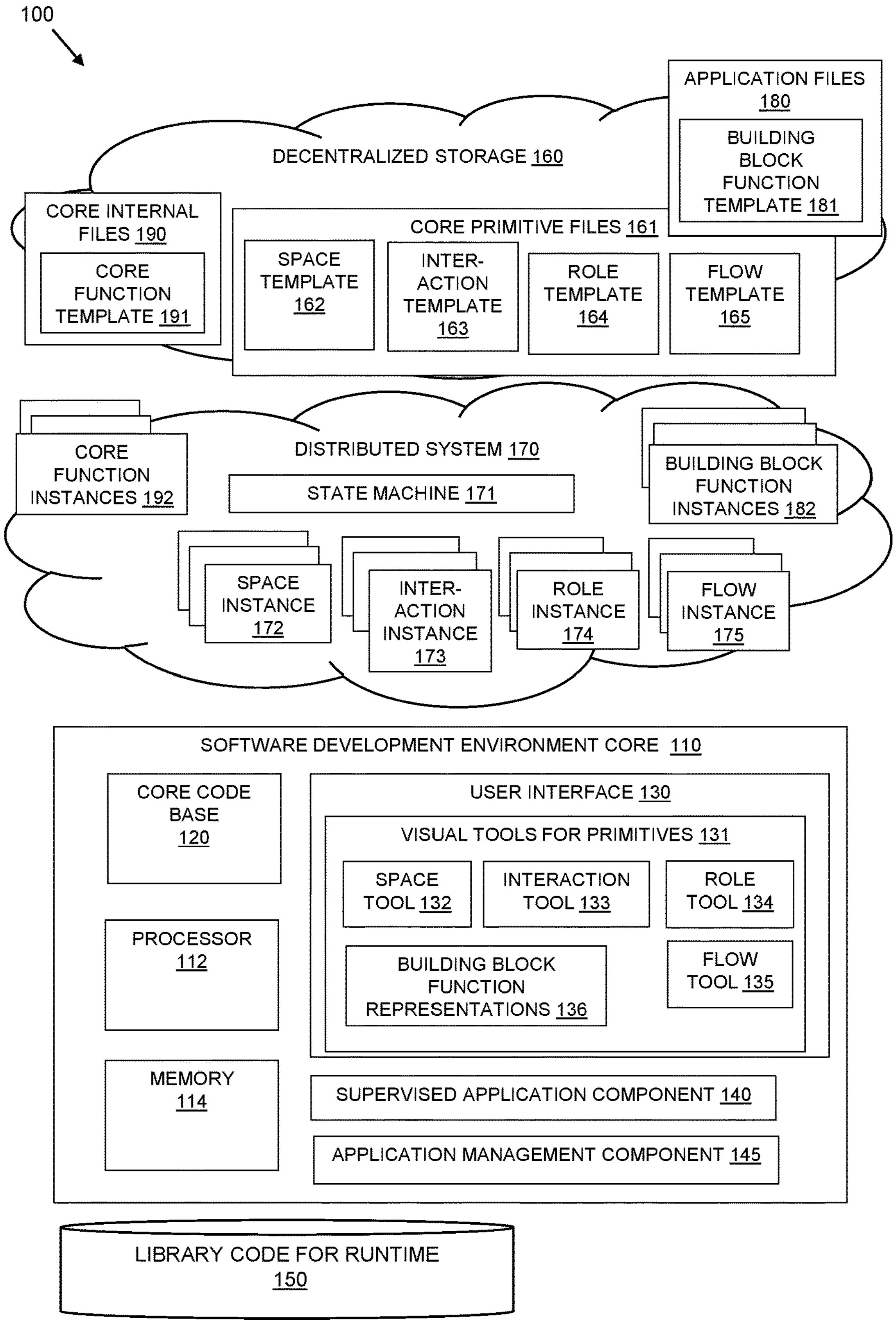
FIG. 1 is a block diagram of an example embodiment of a software development environment in accordance with the present invention.

A software development environment is described that provides a serverless environment for building function-based executable applications. The software development environment is a form of collaboration platform in combination with an IDE.

The function-based executable applications are decentralized applications that use file-based compiling and linking. The files are provided in the form of template files of various primitive functions.

The software development environment has a serverless core that presents a user interface, which may provide access to visual building tools. The visual building tools may, in some embodiments or use cases, be manipulated by a user via the user interface for configuration and interconnection of representations of building-block functions in order to generate a function-based executable application. The user interface provides the representations of building-block functions that are configured to be linked as dependencies by the visual building tools to form a function-based executable application. The user interface provides a fully visual software development environment.

In order to provide the function-based executable applications with decentralized storage, customer building-block functions are provided as remote template files that are called and instantiated by the environment core when a function-based executable application is run from the environment. When a function is required, the template file is called, compiled, linked, instantiated, and run. In some cases, a file is source code and in other cases the file is already a precompiled byte-code or machine-code file version. In some cases, a file is a hosted version that links with the application.

When the template file is precompiled, it is called, linked, instantiated and run. Precompiled files refer to compiled byte-code files or machine-code files. For Elixir this would be compiled BEAM module files. For other languages this may be a compiled executable or library file. The function template files are all immutable as once they are created, they cannot be changed. If a change is required, a new function template file is provided with pointers to the new version. The function template files may be hashed, so that when they are later downloaded from decentralized file systems, the expected hash can be compared with the actual hash to ensure that no tampering or misdirection is occurring. If the hashes match, then it is confirmed that the correct file is being used.

The templates files are provided in decentralized storage. This may include some of the template files being provided in a centralized storage with other template files provided in decentralized storage. The template files may use components that are hosted and run through a guarantee of the environment to operate somewhere. Note that these have an addressing system that is managed, but the code or machine-code are not accessible to the application. This method of hiding provides protection against others copying and reselling the component.

An in-memory data state machine is provided that allows the component instances that form part of an application to manage their own state. As an executable application changes state, the state machine stores this. The state machine distributes itself across a number of nodes, so that if one or more goes down, others take over the load. Also if all go down and it returns, then the state machine manages the restoration of its memory state as this is persisted to memory in a cluster that provides resilience. In one example embodiment, the in-memory data state machine may be provided by Mnesia™ in the form of a distributed, soft real-time database management system written in the Erlang programming language.

The building-block functions are similar to functions provided by known serverless systems; however, they operate in a decentralized way with no central cloud machines of the type that are offered by AWS™, Microsoft™, Google™ and others. The building-block functions may be shared by collaborative users when generating executable applications.

A function-based executable application generated by the environment is defined by addresses of linked instances of customer building-block functions managed by the environment. During a runtime of the function-based executable application, the customer building-block functions are called, compiled (unless precompiled), linked, instantiated, and run, and dependent customer building-block functions are called, compiled (unless precompiled), linked, instantiated, and run, as needed during the runtime. The customer building-block functions of the executable application are compiled and/or linked in this way as the executable application runs.

The function-based executable applications generated and run by the environment include customer function-based executable applications, as well as internal function-based executable applications of the environment. The internal function-based executable applications of the environment include applications providing primitive functions of the environment and core processing application.

The environment core may include core primitive functions providing the building tools (such as visual or non-visual building tools) that are decentralized in a similar manner to the customer building-block functions to provide remote template files that are called and instantiated by the environment core.

The environment core or engine may also itself include internal modules provided as remote template files that are called, compiled (unless precompiled), linked, instantiated, and run by the environment core when required by the environment. Internal processes of the environment core may be provided by function-based executable applications generated using the environment. This enables the environment core to have a small amount of core code as the majority of code required for running the environment, building applications, and running applications is provided remotely by the template files in decentralized storage. The core code of the environment core is loaded first and provides the backbone of the environment. The core code may itself be decentralized.

The environment core may be operated on a virtual machine. Alternatively, the environment core may operate without a virtual machine in a web browser at a client device. In another version, the environment core may be run on WebAssembly™ (WASM) systems and LLVM™ directly on devices without an actual virtual machine. In all cases the environment core or any space may be abstracted to appear as a server.

FIG. 1 is a schematic diagram which illustrates an exemplary system including a decentralized software development environment (100) for function-based executable applications.

The software development environment core (110) includes a core code base (120) that may be operated on a virtual machine or may run without a virtual machine at a client device. This is discussed further below. The core (110) also includes a user interface (130) providing visual tools (131) for function primitives. The visual tools (131) may include core primitives of: a space tool (132), an interaction tool (133) (for actions and reactions), a role tool (134), and a flow tool (135). The visual tools (131) may also include building-block function representations (136) for building-block functions for the function-based executable applications that are being generated using the environment. The software development environment core (110) may also include a supervised application component (140) that is started when an application is executed and an application management component (145). The software development environment core (110) may have a remote library code for runtime (150).

The functions files of the software development environment (100) are provided in decentralized storage (160) in the form of templates of text-based files representing structured data based on data interchange format text-files. These may be source code or precompiled. The template files can be called, compiled (unless precompiled), linked, instantiated and run to provide instances as required. The files include application component files (180) of the executable applications being generated including building-block function templates (181). The files may also include core primitive files (161) including space templates (162), interaction (action/reaction) templates (163), role templates (164), and flow templates (165). The files may also include core internal files (190) including core function templates (191).

A distributed system (170) provides a state machine (171) that includes instances of the templates of the decentralized storage (160). The instances include building-block function instances (182) of the application files (180). The instances also include space instances (172), interaction (action/reaction) instances (173), role instances (174), and flow instances (175) of the core primitive files (161). The instances also include core function instances (192) of the core internal files (190).

The software development environment (100) may run on multiple distributed systems. For example, this may be provided as a peer-to-peer network and/or a blockchain network. A system on which the software development environment core (110) runs includes a processor (112) for executing the functions of components of the core, which may be provided by hardware or by software units executing on the system. The software units may be stored in a memory component (114) and instructions may be provided to the processor (112) to carry out the functionality of the described components. In some cases, for example in a distributed or cloud computing implementation, software units arranged to manage and/or process data on behalf of the system may be provided remotely.

Figure 2:
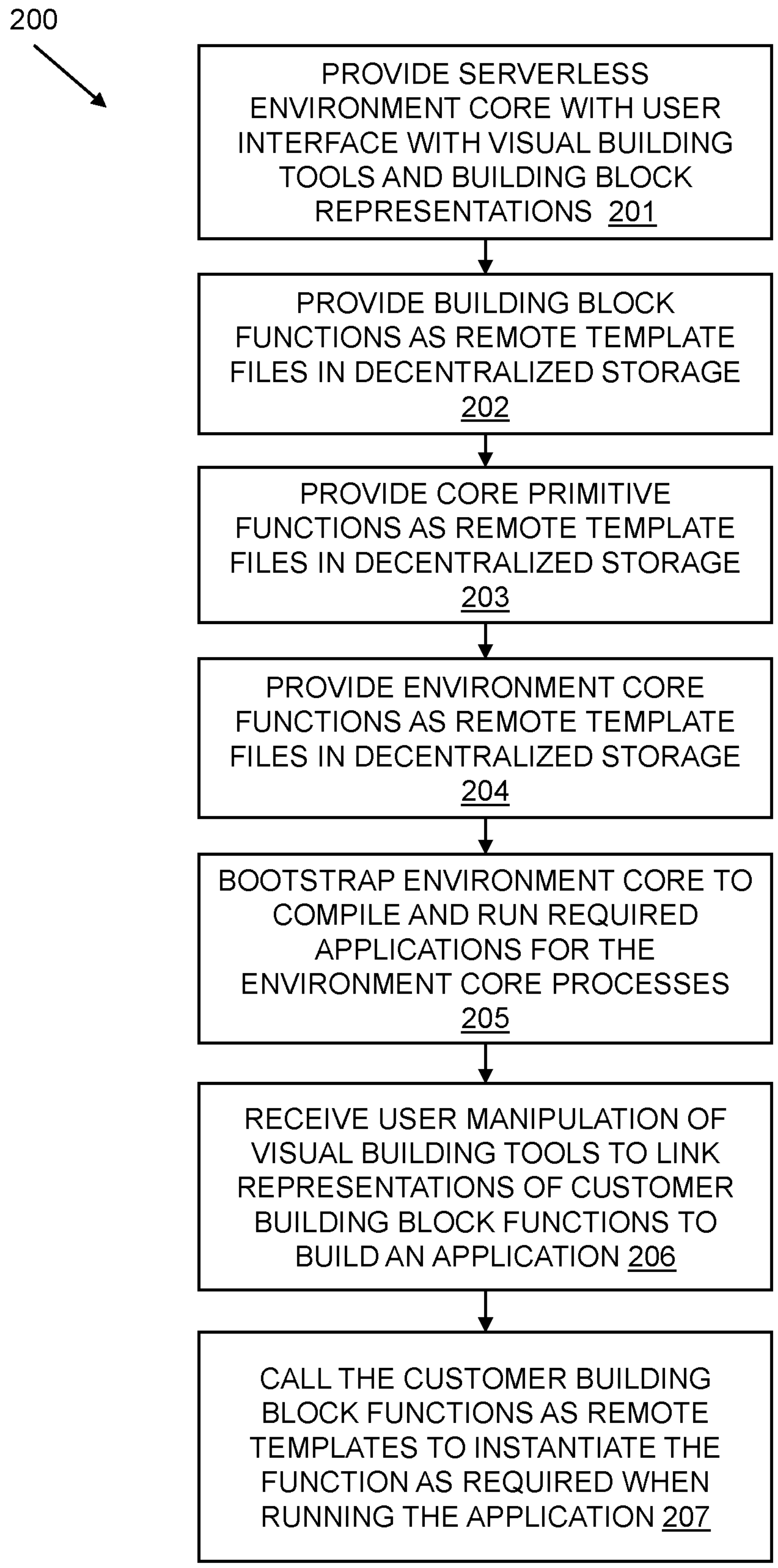
FIG. 2 is a flow diagram of an example embodiment of an aspect of the method in accordance with the present invention.

Referring to FIG. 2, a flow diagram (200) shows an example embodiment of an aspect of the described method of providing a software development environment and building function-based executable applications using the environment.

The method provides (201) a serverless environment core including a user interface providing a plurality of representations of building-block functions configured to be linked as dependencies to form a function-based executable application. The user interface may provide visual building tools configured for user configuration and interconnection via the user interface. The plurality of representations of building-block functions may be configured to be linked as dependencies by the visual building tools. In other embodiments, non-visual building tools may be provided and configured for configuration and interconnection and the plurality of building-block functions may be configured to be linked as dependencies by the non-visual building tools.

The method also provides (202) the building-block functions as remote template files called and instantiated by the environment core as required when the executable application is run and wherein the template files and instantiated modules are provided in decentralized storage.

The method may also provide (203) core primitive functions of the environment core providing the building tools (such as the visual or non-visual building tools), with the core primitive functions provided as remote template files called and instantiated by the environment core when the executable application is run and wherein the template files are provided in decentralized storage.

The method may provide (204) internal functions of the environment core provided as remote template files called and instantiated by the environment core when required by the environment with the template files provided in decentralized storage. The method may provide internal processes of the environment core by executable applications generated using the environment.

The environment core may bootstrap (205) itself when it runs to compile and provide the core processes and dependencies to run the function-based applications required to provide the environment core.

The method may receive (206) user manipulation of the visual building tools to link representations of the customer building-block functions to build a function-based executable application.

The method may call (207) the customer building-block functions as remote template files in decentralized storage that are instantiated by the environment core as required when the function-based executable application is run.

Figure 3:
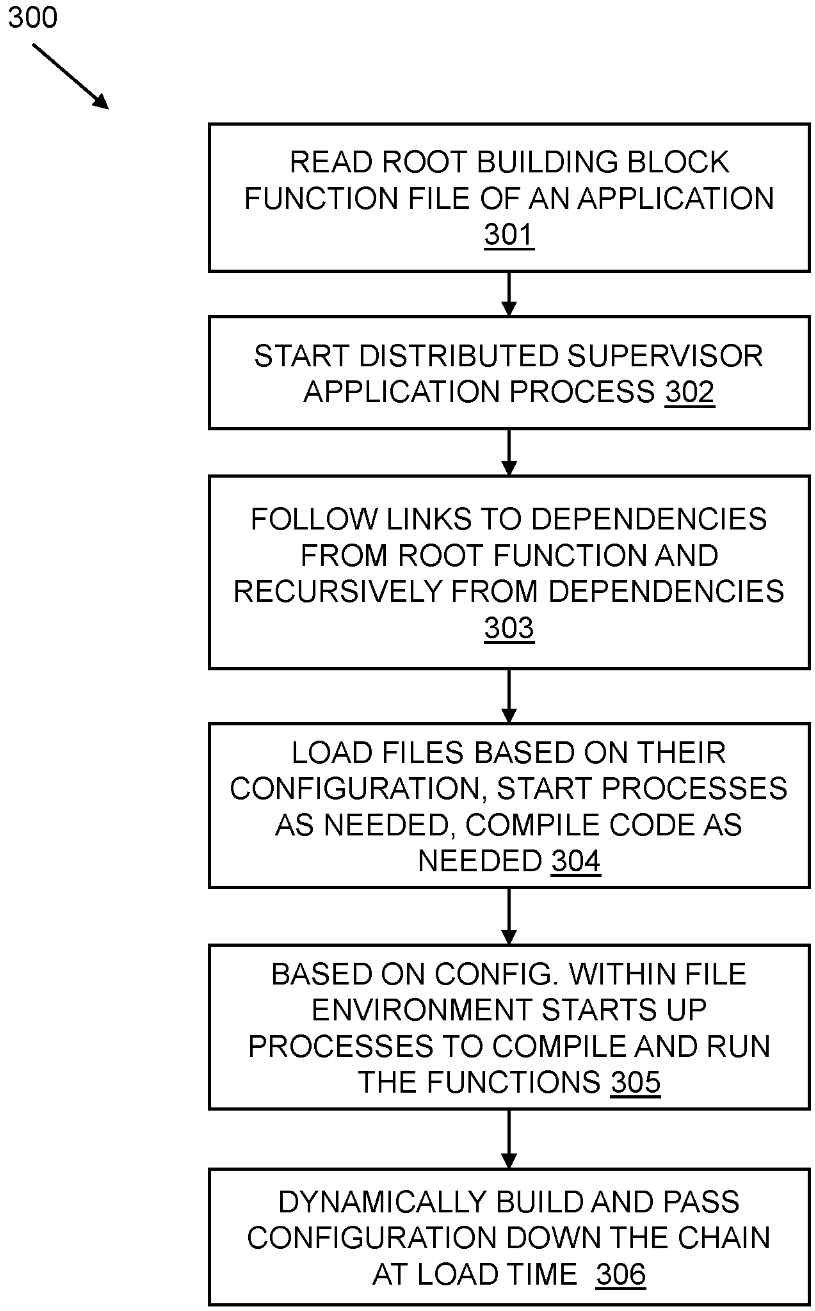
FIG. 3 is a flow diagram of another example embodiment of an aspect of the method in accordance with the present invention.

Referring to FIG. 3, a flow diagram (300) shows an example embodiment of an aspect of the described method of running a function-based executable applications using the environment.

The method reads (301) a root building-block function file of the application in the decentralized storage and starts (302) a distributed supervisor application process at the environment core.

The method follows (303) links to building-block function file dependencies from the root function file and follows the dependencies recursively. This may include providing one or more non-fungible tokens (NFTs) linked, respectively, to one or more building-block function file dependencies. Each of the one or more NFTs may, for example, include a link to the relevant file and may be configured for validation using a blockchain to confirm a right to access the associated file. Access to the relevant building-block function file dependencies may be contingent on successful validation of the associated NFT.

The method loads (304) the linked dependency files of the building-block functions based on their configurations. Based on the configurations, the method within the environment core starts up processes (305) to compile and run the function files retrieved from remote template files in decentralized storage that are instantiated by the environment core as required.

The method may also dynamically build (306) and pass the configurations down the chain at load time with a load step in the chain injecting dynamic configuration into the next load step. This can dynamically configure actions and reactions based on previous load steps into subsequent elements.

The generated applications of the described software development environment are function-based. Effectively a functional system is a "sea of functions" and the environment adds value as it has primitive functions that allows a user to "wrangle" an application together.

In the described environment, instead of being provided by a separate coded system, the primitives are built as functions, so that all functions operate in the same way in the environment thereby reducing complexity. The primitive functions are as follows:

- Spaces—a container mechanism that allows one to create servers/services;
- Interactions (Actions/Reactions)—that connect or point to process flows;
- Roles—which limit rights to specific agents (human or systems) that take on that role;
- Flows—which contain functions; and
- Customer (building-block) Functions—which are the building blocks of flows.

By having the primitive functions, user developers can build functional applications that are clearly structured and manageable. The environment uses these primitive functions to create visual tools around the sea of functions. However, these primitives are also themselves functions and act like the functions of the application building-blocks.

By building an environment core allowing its own primitives to be pure functions, the majority of the environment is built by the environment itself. Helper functions written in the code-base will also be built in by the environment and eliminated from the core code-base. This reduces the core code-base down to a small percentage of what it would otherwise be.

To reiterate, the functions include two types: core primitives, and customer (software development) types, referred to as customer building-block functions.

Both types of functions, the core primitives and the customer building-block functions, are described as small discrete files that have scaffolding (definitions) or shells defined in a text-based data interchange format for representing structured data based on syntax. The scaffolding tells the compiler how to operate, the version information, etc. For example, the scaffolding may be provided as JavaScript™ Object Notation (JSON™). JSON is a standard text-based format for representing structured data based on JavaScript object syntax commonly used for transmitting data in web applications. In another example, the scaffolding may be provided in Extensible Markup Language (XML).

The customer building-block functions may have internal code that is not in the format of the scaffolding. For example, languages such as JavaScript, Python, Rust and Elixir, and others are supported. The customer building-block functions that have internal code in another language have the scaffolding, so they can be stored as JSON. The core primitives may have internal JSON rather than internal code.

In order to keep the environment configuration easily versioned and diff-able, the storage of the functions is designed to be kept in a flat structure, and the environment itself does the work on composing them together at runtime. The storage of the functions are provided as discrete units of data with unique addresses that are accessed at the application level using an application programming interface (API).

The value of ultimately storing the functions in a text-based format for representing structured data (such as JSON) is partly due to the massive reduction of code in the environment's core library (which may be written in a language such as Elixir™), which would become sufficiently small that it can become replaceable by a library of reusable, precompiled programs, for example, a Rust library. This gives the environment the ability to be run on WebAssembly (WASM) systems and LLVM directly on devices without an actual virtual machine (for example, it would not need to operate using the Erlang™ VM [Beam™]).

Other benefits of JSON documents are that they are easy to:

- Link with JSON Schema for validation and JSON for Linking Data (JSON-LD) for linked documents.
- Encrypt;
- Version;
- Persist;
- Share;
- Copy;
- Categorize; and Move to other places—such as being stored on Internet hosting for software development and version control (GitHub™) or InterPlanetary File System (IPFS).

The environment therefore is the "puppet master" and provides a supervised process by the supervised application component. The supervised application component loads a building-block function or a combination of building-block functions. The supervised application component coordinates nodes operating and sharing processes.

A combination of building-block functions is referred to as an "Operator" file. The Operator file is a kick-starter that provides configuration at initial startup and can then observe and manage what is running. The Operator file in turn has links to its dependencies, then recursively each of those may have designated dependencies. All of this may be done in a JSON file. The Operator files may interact to create a larger application but may themselves act as an application. The environment provides a cohesive front end with a fragmented decentralized back end using distributed mechanisms.

Based on the configurations within an Operator file, the environment will start up processes to support that, compile the functions and then run the functions as they need to be run. This provides a supervised process without starting a process per each moving part. The process will not run a process per function, but will instead support the reading and running of those functions.

On startup, the environment is just bare bones with only an application management component loaded. It can then start other fully distributed state machine backed decentralized files dynamically from scratch at runtime.

The storage of the function files is carried out in a decentralized manner. As these functions are all file-based, these are able to be stored in a multiplicity of places. It is typical to store files in the cloud services. However, the described environment stores the files in decentralized peer-to-peer distributed systems. Examples of such systems include: IPFS™, Filecoin™, Arweave™ and many others. These files can be encrypted and stored immutably in these systems. Then, when needed, they can be instantly fetched, unencrypted and utilized.

Storing all these JSON files in a decentralized storage like IPFS, allows the environment to run very efficiently. When an application is started, the environment will only pull in the files and start the processes that it actually needs (dependencies) and will not pull in the bulk of the functions.

In one embodiment, the environment core includes files stored on nodes of a distributed file system (such as IPFS), with a node (for example, an IPFS node) on a user's own computing device storing a local version on the file system. In this manner, the user's computing device has local access to the files. In other words, the user's computing device talks locally. When running applications the environment may use local access to the files via the local node of the distributed file system such that the environment and/or applications execute locally at the user's computing device. In this manner, the environment talks through the local node when running applications. This enables the environment to work in a very fast manner. An example embodiment is written in Rust and processes large folders of files with identifiers faster than a database.

A secure method of loading safe, trusted code is provided by some of the functions being:

1. Certified by the environment. This may be for a fee.
2. Approved by the community (consensus).
3. Get a hash on a blockchain and use that to check before attempting a load. Comparing the hash of the content with the hash that was expected by the codes indicates if there was tampering or use of the incorrect file.

The described software development environment may be able to pull needed library code at runtime from a separate library repository, parts of which could be private and public. One reason is that the full library will later become too large to include in every install. The community may create library code as hot-push code. Hot-push code allows changes to an application to be pushed into the running application.

A space should not need to restart to make use of a new function made available from a community marketplace. This is a benefit of using a virtual machine that allows for hot deployments (for example, Erlang™ VM) to execute the code where one can deploy and be up and running.

An aspect of the described environment is the ability to straddle and combine both the environment core library (for example, in a language such as Elixir™) and the JSON files which together provide the generated function-based executable applications.

An environment library may be provided of components that can be used by projects that are developed on the described environment platform. These components are broken up into the following:

1. Functions: that can be written in multiple languages (such as Python™, Rust™' Javascript™, Elixir™ and others). Functions can include multiple embodiments, such as: AI models, API integrations, data transformations, device interactions, and so on.
2. Flows: which represent processes which themselves have a series of functions. A flow could be seen as a function itself, but unlike functions that are written in code, a flow has a series of functions within a logical process.
3. Spaces: this is akin to a microservice that is designed to fulfill a domain of work. A Space itself has multiple underlying systems and functions, such as roles, interactions (actions/reactions), flows, functions. Owners of a space get a fully-fledged working system that can be moderated, extended or personalized.

Not only can a library item be one of the above, library components can be packaged as collections. An example could be a series of API connectors for Salesforce™—where you get all the API functional connectors you may need to interact with an aspect of Salesforce™.

Every element in an executable application is made up of a multiplicity of other 'mini' applications that work together in an orchestrated way to create the larger application. These mini applications are referred to as "Operators". An Operator may also be more abstract than a process flow. It may run any function in any supported language with any given configuration. For example, it may be a simple job scheduler (for example, a cron job) that starts another Operator at intervals. It may be a single Lambda function that runs once and exits.

An embodiment of a process of running an executable application is described. To start an "Operator", the environment core:

Reads the root SomeOperator.json file that describes the Operator and then

Starts a distributed supervisor application process, with a Mnesia™ persisted state for it based on the configuration and functions it reads.

SomeOperator.json file contains links to other JSON files (via JSON-LD) like:
/roles/common/SomeAdminRole_v0.0.1.json,
/agents/openid/SomeAuthAgent_v0.0.3.json and /flows/http/SomeAPlFlow_v0.1.2.jsono The environment core loads those files too and, based on their configuration, starts processes as needed and/or loads and compiles their code to make the functions and configuration available to the "Operator". The environment core follows the same pattern for each linked JSON file recursively until all linked files are loaded. For example, SomeAPIFlow_v0.1.2.json may link to multiple SomeXXXStep_v0.0.X.json files. Possible infinite recursion issues are handled.

It also becomes possible to dynamically build and pass configuration down the chain at load time:

A load step in the chain can "send" or inject dynamic configuration into the next load step.

This can dynamically configure actions and reactions based on previous load steps into subsequent elements. For example, an API URL determined in a previous load step can be passed to the action that needs to do the API call actions.

Alternatively, a load step can pass the format and details of the reaction it expects back from a subsequent function or action element.

A known generic interface contract may be specified that each JSON file type needs to adhere to (using JSON-schema to verify). This should be as minimal as possible and only provide as much as is needed to bootstrap the Operator or linked element.

This may also provide some sandboxing for security purposes.

The JSON files are like templates that are instantiated by the environmental core. Instantiated Operators have their own state stored in Mnesia™ or alternative systems. This means one could easily launch multiple parallel processing Operators based on the same template each having their own running state.

The environment core may therefore be minimal as it only needs to know:

1. How and where to find the Operator JSON file;
2. How to validate the file against a JSON-schema file;
3. How to read and bootstrap the valid JSON file;
4. How to configure and start the initial Operator distributed supervisor;
5. How to recursively configure, start and link related JSON files under the Operator distributed supervisor. All the rest of the "business logic" is contained in the Operators' linked JSON files.

There is frequently a need for common or library code. This common code may also more easily be managed and versioned in/libraries/common/HttpUtils_v0.2.0.json type files and linked to or included by elements that need them. It may allow for very efficient versioned code reuse.

As the JSON files are stored outside of the environment core in a type of repository (like Git or IPFS), then the actual running instances of the environment are by default optimized. They will only retrieve exactly the files they need to run and only start exactly the number of processes they need to operate the given Operator(s). Shutting down an Operator provides efficient cleanup too. The distributed supervisor will take care of all cleaning up all its linked processes.

The described environment core becomes as minimal as possible and is the puppet master of processes as configured and determined by the JSON template files. This means the environment core is very loosely coupled with the actual functionality of the environment. This results in the environment core also being replaceable. The environment core may run on Elixir/Erlang or may be a Rust-based version, or another language. It would just need to support the generic interface contract format and manage processes.

Upgrades to the executable applications require getting the latest JSON file versions, like a simple package manager. There is no need to restart the environment core unless core code changes. This potentially means real-time (i.e. no downtime), in-place code updates. This may involve some hot code reloading requirements. Executable applications may run to completion and then use the newer version when run again.

The described decentralized software development environment creates function-based software that has to operate somewhere. Due to the current focus is on Web3 as a new iteration of the World Wide Web based on blockchain technology, the described software development environment is capable of delegating some compute onto blockchain-based, or other forms of ledger-driven networks that have some form of smart contract compute. Examples include: Ethereum, Solana, and many other similar platforms. Token-based, peer-to-peer compute networks, include InterPlanetary File System (IPFS), FileCoin™, Arweave™, Render™, and others.

Apart from these publicly available, crypto-driven, networks, which form part of the compute of the generated function-based executable applications of the described software development environment, the environment has to operate its own core systems and some customer building-blocks on a computer system that can operate either on machines with a VM (for example, an Erlang™ VM), or on browsers or machines that allow it to operate with Web Assembly (WASM), or LLVM.

The nature of the described software environment is that there does not need to be a specific cluster of centralized servers, so this means it can run different spaces across any machine that can support VMs or LLVM/WASM. If a user has an application on their phone, it is possible to run a space on that device without a server backend. If the user shares an ecosystem with other users, it is possible to share hardware across all participants in a 'private peer-to-peer' network.

Another use-case is the ability to set up a home or office device that is private to the user(s), which is a base processing unit and does a lot of the heavy lifting, such as complex integrations, complex business logic, or even hosting the user's own blockchain nodes or peer-to-peer nodes (such as IPFS). The user can have an application on their lower-processing capacity devices (such as a phone or a website) that is driven from their local machine base processing unit and when the user's device is remote it connects to the home machine via the Internet.

Some of the user's compute layers may be distributed onto other devices, such as drones, satellites, motor vehicles, watches, smart devices, wearables, edge-based AI devices, and so on, to create a swarm of participating devices that make up a compute layer. All that is needed for any device or system to operate is the ability to place a space onto that device that can utilize a supported VM (for example, the Erlang™ VM (i.e. 'Beam™')) or any LLVM/WASM supported device. Then that space can interoperate with any other space on the user application devices or other participating device. It should be noted that any space that is connected to the Internet can also reach out directly to any system that has a standardized interface such as a REST API, or similar API system.

An economic arrangement based on tokens may be provided including hosting compute nodes on machines to earn or "mine" tokens. Any "miner" can offer their machine as a compute layer for other people to operate their environment spaces. The miner can host one or more environment nodes. A node represents the compute arena for an environment space to operate. An environment space operating on a node needs a CPU system to run the compute, but it also requires some memory allocated to hold the 'state' required for the compute.

Safe distributed systems need to be clustered in case a node goes down or a machine goes down. So if a customer is reliant on the uptime of a space, it behooves the space to be clustered across multiple nodes, across multiple machines in multiple locations. For this reason, an environment space would be distributed across, say, three separate machines, each in three separate IP locations. For mission critical systems, or systems that need heavy load scalability, the space can be set up to run across a number of machines. So, for example, a five-machine cluster would be very safe, but a space that has massive activity can be set up with an arbitrary number of nodes. An example could be 20 machines or even a hundred machines, or a thousand machines. Dynamic clustering could also be set up where there is a base number of machines, say three machines, but dynamic rules will spin up additional machines across the environment network, should load dictate more compute. The only limitation would be that each node has to be paid for.

Customers that want to host their applications on the environment network would need to stake a certain number of tokens, that would entitle them to an ongoing number of nodes for the hosting of their space compute layer. If a user has greater compute needs, they will need to stake more tokens. A customer can also contribute their own machines to host their own spaces for free, but could also mine tokens by allowing third parties to use spare compute/memory availability.

Miners may earn new tokens that are issued by the environment network token distribution system. Subject to some limitations, the miner may sell their environment tokens on the environment marketplace.

In another embodiment, in addition to or as an alternative to the general token model, a non-fungible token (NFT) model may be provided. The NFTs represent software code components of the decentralized files as described above in the described environment. NFTs represent software code components in the form of the building-block functions that may be stored in the environment library, for example, as spaces, flows, or functions. An NFT may represent the rights to use multiple types of components including: a specific component; a group of components in a specific batch; or the right to free compute of a space cluster.

In order to compile the building-block function files in the described environment, a user would need to own an NFT that provides access to the files to be used in an application. The NFT can provide access in one of the following ways:

1) Get the source code and compile;
2) Get a precompiled version with some sort of machine or byte code; or
3) Gain access to a hosted version of that piece that interacts and effectively becomes part of your application. A hosted version may run somewhere on another party node with access provided to it.

The NFT model creates a sharing economy for the building blocks of software, but also creates a reusability economy whereby builders of software can rip out components and sell those to others.

There are multiple NFT components that can be used, or built as follows.

1. Core NFT component: In order to use the environment at all, a project would need to own the core NFT, which would give them access to any of the components in the environment public core. It may be that the core NFT is free, or at least free to early adopters. Later, a core NFT may be issued to any stake of a minimal amount of environment tokens.
2. Library NFT components: The library can contain a number of prebuilt Spaces, Flows, Functions and templates that customer can use to short-circuit the building of their applications. There is no need to regenerate a piece of work that is already built. For example, that a user needs an SMS system for their application to send and receive text messages as part of its workflow. Someone, or the environment team, may have already built the environment capabilities to send and receive SMS in the most cost-effective manner. In this case, a customer may simply purchase the SMS Code NFT, and it will be compiled into their project. This means that without any coding they add this capability into their software, and while they own that NFT, it will continue to provide that functionality to their systems.

So an NFT with in-built economic mechanisms would simplify the building and using of software components so that the customer need not worry about building the application, managing translation and payment of currency, and in the case of relying on third party compute, would not need to worry about setting up and operating the software a third party cloud service.

3. Customer building their own components: In many cases, there may be a need to build a user's own component. This could be done by a customer's own team, in which case they will use the environment developer environment to build their own component—each of which would lead to an NFT being minted to represent their ownership of that component. The NFT rules would determine who has the right to use and operate that component.
   a. A customer may make it a private NFT so that only they can have access to that component
   b. They may make it a publicly available NFT, so that third parties can buy a newly minted copy of the NFT in the environment NFT marketplace. Third parties would pay a fee and the environment marketplace would earn a percentage of the payment for facilitating the process, with the balance being transferred to the creator of the NFT.
   c. In some cases, there may be limits on how many copies of the NFT could be minted for others to buy and use.
4. Delegating the building of a component to environment community developers: In many cases, it is more expedient to outsource the building of a component to a third party participant in the environment network. In this case, the customer will define the scope of the component and will pay the third party for the work. Once delivered and accepted, the environment would create an NFT to represent the ownership of that component. Special rules could be embedded in the NFT, such as:
   a. A customer may make it a private NFT so that only they can have access to that component
   b. They may make it a publicly available NFT, so that third parties can buy a newly minted copy of the NFT in the Environment NFT marketplace. Third parties would pay a fee and the environment marketplace would earn a percentage of the payment for facilitating the process, with the balance being transferred to the creator of the NFT.

c. In some cases, there may be limits on how many copies of the NFT could be minted for others to buy and use.

d. The NFT could also have special rules so that when the NFT is re-minted and sold to third parties any or all of the following could earn additional revenues from the sale:

i. Environment marketplace always gets their cut;

ii. The commissioner of the NFT component gets their pre-described cut;

iii. The builder of the NFT component may also earn out a percentage of the revenue each time it is sold—and this may have been part of the initial price negotiation, so that they may have discounted the work up front in order to earn marketable NFT components down the line.

5. Building Derivative works: As the environment applications are modular block connecting systems where an application may use other NFT components, but these subordinate components are NFTs that could be owned by others who need to earn their share of the sale of the NFTs.

a. A user's higher-level application, space, flow or function can be assembled into a component that others can use. In that case you would have a minted NFT that encapsulates your component.

b. When someone buys an NFT component, the system itself would mint any subordinate NFTs.

c. On the sale of an NFT-based component, then the system would take the purchase consideration, and automatically use those funds to purchase all the subordinate NFTs automatically. So, in this case, all other component providers will be settled, and your NFT component will retain any of the profit, which will be paid via the higher NFT rules.

In order to initiate the community, an initial set-up may be provided to:

Host multiple node machines on AWS EC2 instances;

Build multiple NFT-based components in the environment library; and

Organize to have multiple developers waiting in the wings to build components for customers.

The described decentralized software development environment (referred to as "the environment") is a decentralized and incentivized infrastructure to provision development and compute capabilities to a broad range of distributed serverless applications. The core component of this is a microservice network ("servicenet") that provides compute capabilities for applications built in the style of functional development, providing tools and capabilities that are far faster, easier and cheaper to build and to host than traditional centralized functional systems such as AWS Lambdas.

Nodes in the servicenet are rewarded via a proof of microservice scheme that proves that service nodes are providing a high quality of compute service. Rewards given by tokens allow anyone to join the environment and enable a sustainable economic model for development and compute provision. The tokens can be transformed into environment credentials that allow users to privately prove their "right to use" services in a decentralized and verifiable manner. The environment can serve as the foundation for a vast range of distributed applications that provide cheap and easy development and hosting across the globe, to empower any business or entity to build and compete with software solutions, in such a way as to level the playing fields so that they compete, with fewer human resources, and lower budgets than the powerful highly-funded adversaries.

In the above description, the file storage of sub-elements, or sub-components of a full application is discussed. The source code of those components can be stored in a distributed and/or decentralized manner on cloud services such as AWS S3, or decentralized networks like IPFS (or derivative networks such as FileCoin or Arweave).

In order to execute an application, a user needs to compile these components and link then into their running application. Due to the underlying Erlang systems, it is possible to link in multiple components at runtime. This means that a basic application can be bootstrapped to get the application running and then add on the other pieces as needed in seconds. It also means that new components can be removed and added as needed. Furthermore, it also means that an older version of a component can be swapped out with a new version as needed. All of this without restarting the application.

Note that in order to use the components in an application, the described environment may use a NFT as the license gatekeeper, i.e. a user has the NFT, then the system will use that 'right' to access and utilize the component connected to via the NFT. An NFT points to a file, and it can be a programmable NFT that has smart-contract-like rules around the utilization and distribution of the NFT to different parties.

There are three ways a component can be connected into a running application:

In a first way, the source code is available to a user's application by a license (mediated by the NFT). In this case the user's core bootstrapped application will:

Find the source code that it is entitled to utilize—typically on an IPFS (or in some cases even cloud or other service);

Compile that code into a byte-code or machine-code element; and

Bind in that byte-code/machine-code into the user's running application.

In another case, the user will not have access to the source code, but instead that source code will be pre-compiled into byte-code/machine-code. The NFT will still be used to mediate the user's application's license to this file. The user's core bootstrapped application will:

Find the byte-code/machine-code file that it is entitled to utilize—typically on an IPFS (or in some cases even cloud or other service); and Bind in that byte-code/machine-code into your running application.

Another approach is one where the component the user wishes to utilize in their application is already compiled and instantiated, but the component (or one could call it a third party application) is hosted on a compute layer that the user's application did not have to spin up or operate. Note that in this case, the compute layer would still be a network-managed space across multiple nodes in a cluster. A third party would cover the cost of that compute layer. The user's access to this component/application will be mediated by the user's ownership of the NFT, and the user's core bootstrapped application will:

Find the running app, by its address (in a manner consistent with how Erlang applications interact across multiple machines through its virtual addressing protocol.)

The NFT will be checked to ensure the user's application has a license to utilize the third party application.

The user's application will interact with the third party application through its network space and its flows. So

- the user's application will use actions and reactions in a manner that would be the same as if the user were self-hosting that third party application.
- The internals of that third party application will be unknown to the user's application, being an effective black box. But the interface would be described, as mentioned above, using the same space/roles/actions mechanisms as is standard in an application.

In the case of a source-code available NFT license, there is an agreement that the user would keep the source code confidential for their own use. In the case of a byte-code NFT license, the user would agree not to decompile and distribute the compiled version. In the case of the third-party-hosted NFT-license, the user would have no access to the source code or bytecode and would simply be able to access the service due to your continued ownership of the NFT.

The above describes the compile-time aspects, meaning the user's application requires the NFT in order to link in the component into their running code (case 1 and 2); or connection-time, meaning the user's application requires the NFT to connect to the third party hosted application component. However, if after compiling and setting up the component into a user's running application, the user may decide to sell their NFT license to a third party. In this case the user would lose their license to run the application. So, in this case, the application needs to ensure that the user has retained their NFT license in order to continue to run the application.

In the case where the user no longer has an NFT license, the environment component will cease to run, although there may be exceptions. If the rules of the NFT give the user the right to resell the NFT after compile time or link time, or even at run-time, then the user would not be affected by giving up their NFT license.

As the environment NFTs are programmable, there may be rules on distribution of user license as follows. On sale of the NFT, the proceeds of the sale may be distributed to:

- The person who paid for/commissioned the component.
- The person who built the component.
- The initial exchange through which the NFT was sold. (The environment may be the exchange where the NFT was sold, but as NFTs are decentralized, other exchanges may also offer NFTs for sale between buyers and sellers).
- The current exchange which sold the NFT (if different from the original exchange).

When the component is created, a choice would need to be made about how many NFTs would be sold that represent licenses to the component.

The options are:

- Private NFT—meaning only one is made/sold.
- Fixed number—to create scarcity—so a limited edition of components may be sold—which in some cases may lead to higher values.
- Unlimited—meaning any number of NFTs can be minted and distributed.

It is envisaged that even if a fixed number or unlimited number of NFT copies will be made available for sale, that the party who commissioned the NFT may convert a private to a fixed number or an unlimited number of NFTs at a later stage. As NFTs can be programmable, this would be easy to achieve after the fact. So for example, a private NFT may be used by a company that creates a complex platform—say for 18 months—but they then decide to monetise elements of their software down the line once it has a proven track record.

This will lead to a more effective method of licensing software than the current software licenses today.

Note that as the environment has ways to create different types of components, any one of them could be licensed by an NFT, such as: space, roles, interactions/flows (actions/reactions), functions (steps/building-blocks), templates (which describe configuration schemes), or any bundling of the above into sets.

Figure 4:
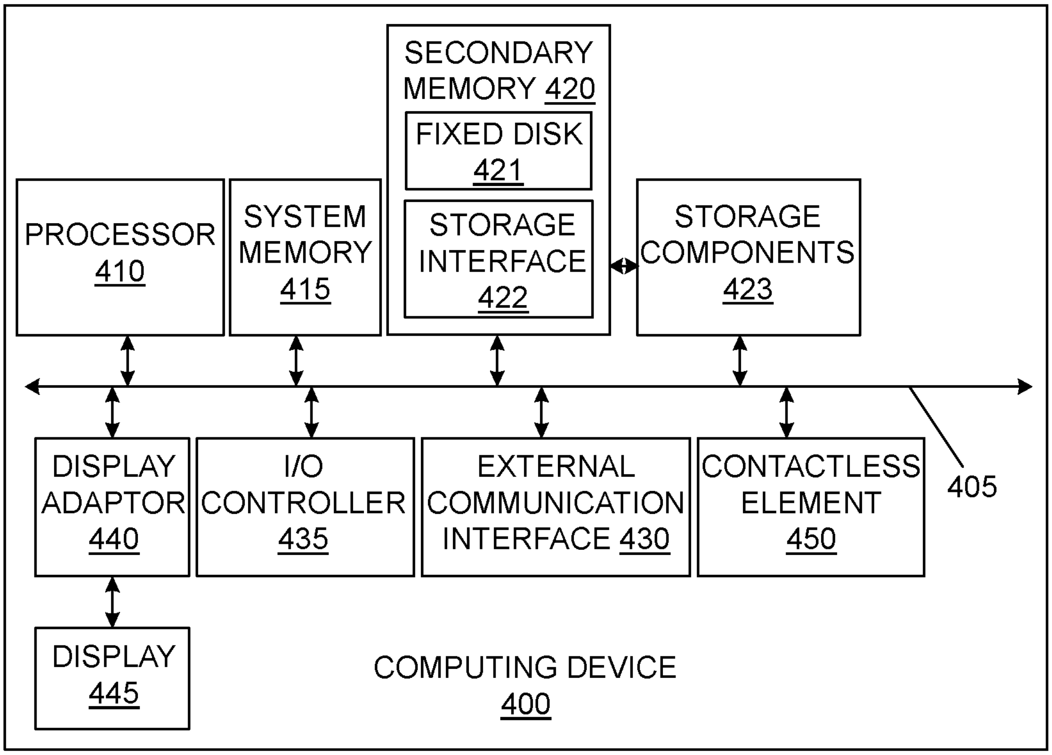
FIG. 4 illustrates an example of a computing device in which various aspects of the disclosure may be implemented.

FIG. 4 illustrates an example of a computing device (400) in which various aspects of the disclosure may be implemented. This is described as a generic computing device that may be used as a device supporting the above described distributed systems.

The computing device (400) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (400) may be suitable for storing and executing computer program code. The various participants and elements in the previously described system diagrams may use any suitable number of subsystems or components of the computing device (400) to facilitate the functions described herein. The computing device (400) may include subsystems or components interconnected via a communication infrastructure (405) (for example, a communications bus, a network, etc.). The computing device (400) may include one or more processors (410) and at least one memory component in the form of computer-readable media. The one or more processors (410) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (400) may be distributed over a number of physical locations (e.g. in a distributed, cluster or cloud-based computing configuration) and appropriate software units may be arranged to manage and/or process data on behalf of remote devices.

The memory components may include system memory (415), which may include read only memory (ROM) and random access memory (RAM). A basic input/output system (BIOS) may be stored in ROM. System software may be stored in the system memory (415) including operating system software. The memory components may also include secondary memory (420). The secondary memory (420) may include a fixed disk (421), such as a hard disk drive, and, optionally, one or more storage interfaces (422) for interfacing with storage components (423), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (400) may include an external communications interface (430) for operation of the computing device (400) in a networked environment enabling transfer of data between multiple computing devices (400) and/or the Internet. Data transferred via the external communications interface (430) may be in the form of signals, which may be electronic, electromagnetic, optical, radio, or other types of signal. The external communications interface (430) may enable communication of data between the computing device (400) and other computing devices including servers and external storage facilities. Web services may be accessible by and/or from the computing device (400) via the communications interface (430).

The external communications interface (430) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (410). A computer program product may be provided by a non-transient or non-transitory computer-readable medium, or may be provided via a signal or other transient or transitory means via the communications interface (430).

Interconnection via the communication infrastructure (405) allows the one or more processors (410) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (400) either directly or via an I/O controller (435). One or more displays (445) (which may be touch-sensitive displays) may be coupled to or integrally formed with the computing device (400) via a display or video adapter (440).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. Components or devices configured or arranged to perform described functions or operations may be so arranged or configured through computer-implemented instructions which implement or carry out the described functions, algorithms, or methods. The computer-implemented instructions may be provided by hardware or software units. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional, functional, or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method of providing a software development environment for function-based executable applications comprising:

providing a serverless environment core including a user interface providing a plurality of representations of building-block functions configured to be linked as dependencies to form a decentralized function-based executable application that uses file-based compiling and linking;

providing the building-block functions as remote template files called and instantiated by the environment core to provide instances of the remote template files as required when the decentralized function-based executable application is run and wherein the remote template files are provided in decentralized storage and the instances of the remote template files are run in a distributed system;

wherein the user interface provides visual building tools configured for user configuration and interconnection via the user interface, wherein the plurality of representations of building-block functions are configured to be linked as dependencies by the visual building tools;

wherein the environment core includes core primitive functions providing the visual building tools which are provided as remote template files called and instantiated by the environment core when required, wherein the template files are provided in decentralized storage; and wherein the core primitive functions include: a container function for creating services, an action and reaction function for pointing to flows, a role function for limiting entities to provide the role, and flow functions.

2. The method as claimed in claim 1, wherein the user interface provides visual building tools configured for user configuration and interconnection via the user interface, wherein the plurality of representations of building-block functions are configured to be linked as dependencies by the visual building tools, and wherein the method includes receiving user manipulation of the visual building tools to link representations of the building-block functions to build a function-based executable application.

3. The method as claimed in claim 1, including:

generating a function-based executable application using the environment by linking required template files; and, running the function-based executable application using the environment by instantiating the required template files from decentralized storage locations and converting the template files into running parts linked together to form the application.

4. The method as claimed in claim 1, including calling the building-block functions as remote template files in decentralized storage that are compiled unless they are precompiled, linked, instantiated and run and dependent building-block functions of the building-block functions are called, compiled unless they are precompiled, linked, instantiated and run, as needed during runtime, wherein the remote template files are retrieved from decentralized storage and run in a distributed system with nodes provided on multiple computing devices.

5. A system including a processor and a memory for providing a decentralized software development environment for function-based executable applications comprising:

a serverless environment core including a user interface providing a plurality of representations of building-block functions configured to be linked as dependencies to form a decentralized function-based executable application that uses file-based compiling and linking;

wherein the building-block functions are provided as remote template files called and instantiated by the environment core to provide instances of the remote template files as required when the decentralized function-based executable application is run and wherein the remote template files are provided in decentralized storage and the instances of the remote template files run in a distributed system;

wherein the user interface provides visual building tools configured for user configuration and interconnection via the user interface, wherein the plurality of representations of building-block functions are configured to be linked as dependencies by the visual building tools;

wherein the environment core includes core primitive functions providing the visual building tools which are provided as remote template files called and instantiated by the environment core when required, wherein the template files are provided in decentralized storage; and wherein the core primitive functions include: a container function for creating services, an action and reaction function for pointing to flows, a role function for limiting entities to provide the role, and flow functions.

6. The system as claimed in claim 5, wherein the environment core includes internal functions provided as remote template files called and instantiated by the environment core when required by the environment, wherein the template files are provided in decentralized storage and wherein internal processes of the environment core are provided by executable applications generated using the environment.

7. The system as claimed in claim 5, wherein the building-block functions are discrete text files with definitions in a data interchange format providing a scaffolding for the functions and supporting internal code in one or more programming languages.

8. The system as claimed in claim 6, wherein the core primitive functions are discrete text files with definitions in a data interchange format providing a scaffolding for the functions in the data interchange format and supporting internal code in the data interchange format or in other languages.

9. The system as claimed in claim 5, wherein the function-based executable application generated by the environment is defined by addresses of linked instances of customer building-block functions managed by the environment and backed by an in-memory data state machine that stores states of the functions.

10. The system as claimed in claim 5, wherein the template files are configured to be called, compiled, linked, instantiated, and run when required.

11. The system as claimed in claim 5, wherein the building-block functions of the function-based executable application are called, compiled, instantiated and run as needed during runtime, and wherein dependent building-block functions of the building-block functions are called, compiled, instantiated and run as needed during runtime.

12. The system as claimed in claim 5, wherein the environment core is operated as compiled code directly on a user computing device with the template files provided in decentralized peer-to-peer distributed systems, wherein the user computing device includes a memory for storing computer-readable program code and executable on one or more processors to execute the computer-readable program code.

13. The system as claimed in claim 5, wherein the environment core includes files stored on a distributed file system node on a user computing device with a local version on the file system, wherein when running executable applications the environment talks through the node on the user computing device, and wherein the environment core pulls needed library code of the text files at runtime from a separate library repository.

14. The system as claimed in claim 13, wherein the user computing device is a dedicated computing device providing a base processing unit with multiple lower-processing capacity devices providing distributed compute layers and providing an application to a lower-processing device driven from the base processing unit for remote connection.

15. The system as claimed in claim 5, wherein the decentralized software development environment includes an environment library of software code components shared by or to projects developed in the environment, wherein the library components include one or more of: function components written in various computer languages, flow components of processes of a series of functions;

and space components as a container component of a domain of work including functions, roles, interactions, flows and/or functions.

16. A computer program product for providing a software development environment for function-based executable applications comprising a non-transitory computer-readable medium having stored computer-readable program code for performing the steps of:

providing a serverless environment core including a user interface providing a plurality of representations of building-block functions configured to be linked as dependencies to form a decentralized function-based executable application that uses file-based compiling and linking;

providing the building-block functions as remote template files called and instantiated by the environment core to provide instances of the remote template files as required when the decentralized function-based executable application is run and wherein the remote template files are provided in decentralized storage and the instances of the remote template files are run in a distributed system;

wherein the user interface provides visual building tools configured for user configuration and interconnection via the user interface, wherein the plurality of representations of building-block functions are configured to be linked as dependencies by the visual building tools;

wherein the environment core includes core primitive functions providing the visual building tools which are provided as remote template files called and instantiated by the environment core when required, wherein the template files are provided in decentralized storage; and wherein the core primitive functions include: a container function for creating services, an action and reaction function for pointing to flows, a role function for limiting entities to provide the role, and flow functions.

* * * * *